(12) United States Patent
Shanton, III

(10) Patent No.: US 6,278,535 B1
(45) Date of Patent: Aug. 21, 2001

(54) SONET JO BYTE MESSAGE MONITORING SYSTEM

(75) Inventor: John L. Shanton, III, Jefferson, MD (US)

(73) Assignee: CIENA Corporation, Linthicum, MD (US)

(*) Notice: Subject to any disclaimer, the term of this patent is extended or adjusted under 35 U.S.C. 154(b) by 0 days.

(21) Appl. No.: 09/072,780

(22) Filed: May 6, 1998

(51) Int. Cl.[7] .............................. H04J 14/02; H04J 14/08; H04B 10/02; H04L 12/28; H04L 12/56
(52) U.S. Cl. .................. 359/124; 359/127; 359/135; 359/177; 370/412; 370/428
(58) Field of Search ........................... 370/474, 476, 370/428, 412, 429, 252; 359/124, 127, 155, 177; 375/224, 228

(56) References Cited

U.S. PATENT DOCUMENTS

| 4,956,839 | * | 9/1990 | Torii et al. ............................. 370/60 |
| 5,383,046 | | 1/1995 | Hiroaki et al. ....................... 359/176 |

FOREIGN PATENT DOCUMENTS

| 0400959 | 12/1990 | (EP) . |
| 0486874 | 5/1992 | (EP) . |
| 0744845 | 11/1996 | (EP) . |
| 0766421 | 4/1997 | (EP) . |
| 2292872 | 3/1996 | (GB) . |
| 05110584 | 4/1993 | (JP) . |

OTHER PUBLICATIONS

Okamoto, S., et al.: "Inter–Network Interface for Photonic Transport Networks and SDH Transport Networks", Global Telecommunications Conference, US, New York, IEEE, pp. 850–855.

* cited by examiner

*Primary Examiner*—Leslie Pascal
*Assistant Examiner*—M. R. Sedighian
(74) *Attorney, Agent, or Firm*—David L. Soltz

(57) ABSTRACT

A WDM system carrying a plurality of optical signals, each at a respective wavelength, is provided whereby each optical signal includes a plurality of frames, each frame conforming to a synchronous optical network (SONET) standard. A plurality of optical transmitter modules output a corresponding one of the plurality of optical signals, and each of a plurality of optical selector at a receiving end of the WDM system selects a respective one of the plurality of optical signals. In addition, a plurality of receiver modules are provided respectively connected to each of the optical selectors. Both the transmitter and receiver modules include byte extraction circuitry that extracts one byte, e.g., the J0 byte, from each of the plurality of frames. Successive bytes are grouped as messages, which are stored in registers so that comparisons can be made between consecutive messages and a predetermined message.

25 Claims, 5 Drawing Sheets

US 6,278,535 B1

SONET J0 BYTE MESSAGE MONITORING SYSTEM

BACKGROUND OF THE INVENTION

The present invention is directed toward optical communication systems.

WDM systems are currently being deployed in order to increase the bandwidth or capacity of fiber optic networks. WDM systems typically include a plurality of transmitters, each respectively transmitting signals on a designated one of a plurality of channels or wavelengths. Each transmitter has an associated remodulator, which converts the wavelength of optical signals external to the WDM system to one of the WDM wavelengths. The channels are combined by a multiplexer at one end terminal and transmitted on a single fiber to a demultiplexer at another end terminal where the channels are separated and supplied to respective receivers. Typically, the receivers generate output optical signals corresponding to the optical signals input to the remodulators.

For monitoring purposes, it is advantageous to readily ascertain input and output optical signals associated with a given WDM channel. In WDM systems having low channel counts, e.g., less than 16, it is relatively easy to identify channel assignments. For systems having channel counts in excess of 100, however, it is difficult to trace a given output optical signal from the WDM system to the corresponding channel it was transmitted on because there are a large number of optical signals supplied to and output from the WDM system.

SUMMARY OF THE INVENTION

Consistent with the present invention, a WDM system carrying a plurality of optical signals, each at a respective wavelength, is provided whereby each optical signal includes a plurality of frames, each frame conforming to a synchronous optical network (SONET) standard. A plurality of optical transmitter modules output a corresponding one of the plurality of optical signals, and each of a plurality of optical selectors at a receiving end of the WDM system selects a respective one of the plurality of optical signals. In addition, a plurality of receiver modules are provided respectively connected to each of the optical selectors. Both the transmitter and receiver modules include byte extraction circuitry that extracts one byte, e.g., the J0 byte, from each of the plurality of frames. Successive bytes are grouped as messages, which are stored in registers so that comparisons can be made between consecutive messages and a predetermined message.

The messages can contain any data desired by the user. However, messages including WDM channel identification data are particularly useful in tracing the WDM channel that carried the bytes that constitute the message. Since, according to the present invention, comparisons can be made between successive messages and a predetermined message, the WDM channels can be more effectively monitored and fault locations, whether outside or within the WDM can be readily determined.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION

Figure 1:
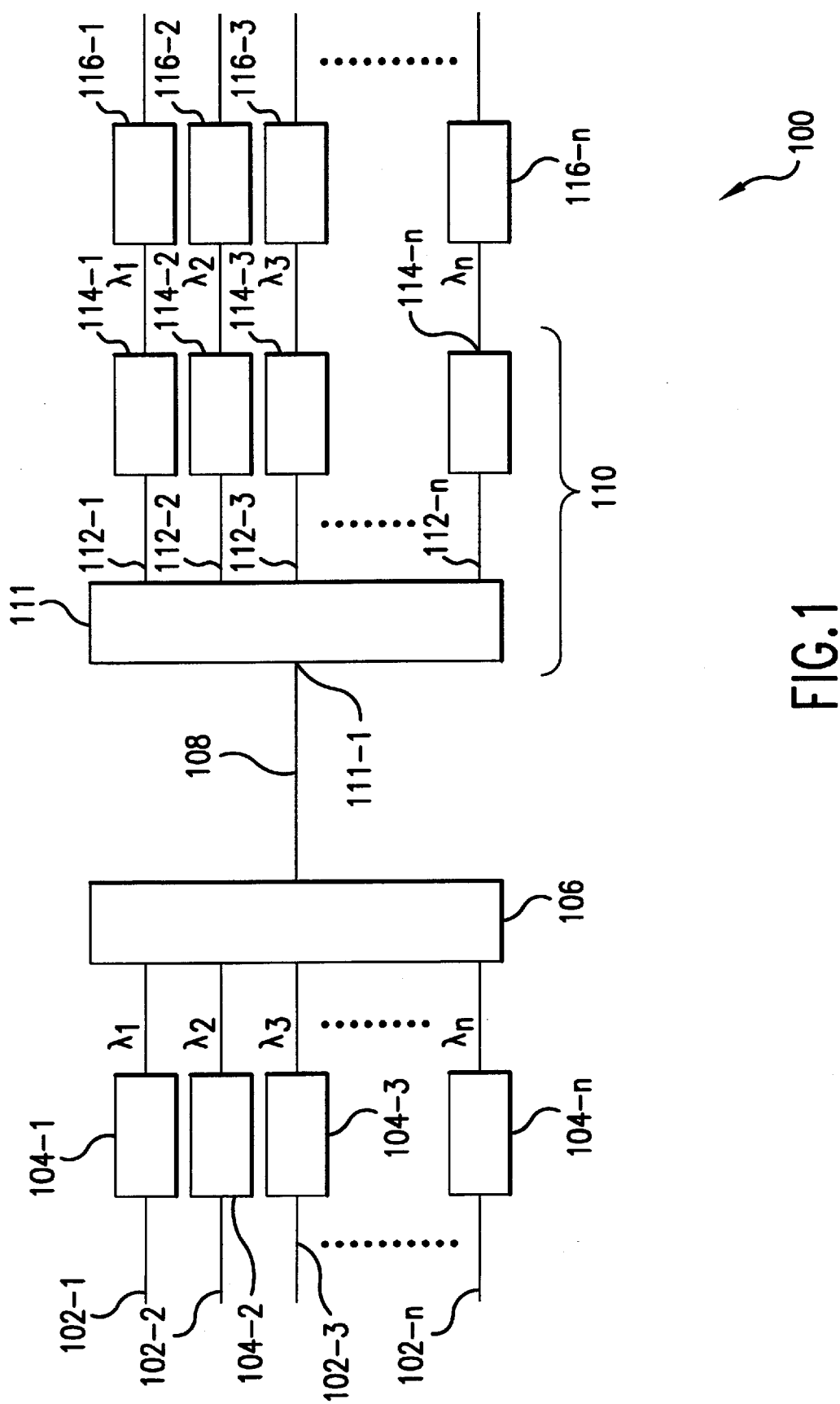
FIG. 1 illustrates a block diagram of a WDM system in accordance with the present invention.

Turning to the drawings in which like reference characters indicate the same or similar elements in each of the several views, FIG. 1 is a simplified view of WDM system 100 in accordance with the present invention. WDM system 100 includes a plurality of input ports 102-1 to 102-n, each receiving a respective one of a plurality of input optical signals from a metropolitan area network (MAN), local area network (LAN) or wide area network (WAN), for example, or other network. These optical signals generally constitute a series of SONET frames. Each of input ports 102-1 to 102-n is coupled to a corresponding one of transmitter modules 104-1 to 104-n, which respectively output WDM channels $\lambda_1$ to $\lambda_n$ to a known optical multiplexer 106, including an optical combiner, as described, for example, in U.S. Pat. No. 5,715,076, incorporated by reference herein. The WDM channels typically carry SONET frames corresponding to the SONET frames received at input ports 102-1 to 102-n. Optical multiplexer 106 typically combines channels $\lambda_1$ to $\lambda_n$ onto a single optical fiber for transmission to an optical demultiplexer 110. If the distance between multiplexer 106 and demultiplexer 110 is relatively long, WDM channels $\lambda_1$ to $\lambda_n$ can be attenuated significantly. Accordingly, an optical amplifier (not shown), including, for example, an erbium doped fiber, can be provided in order to increase the strength of the WDM channels.

Optical demultiplexer 110 can include, for example, an optical splitter 111 having an input 111-1 coupled to optical fiber 108 and a plurality of output ports 112-1 to 112-n. Each of WDM channels $\lambda_1$ to $\lambda_n$ is output on each of ports 112-1 to 112-n, but with reduced power by a factor of n, to a respective one of selectors 114-1 to 114-n, as described for example, in U.S. Pat. No. 5,557,439, incorporated by reference herein. Each of selectors 114-1 to 114-n respectively outputs one of WDM channels $\lambda_1$ to $\lambda_n$ to a corresponding one of receiver modules 116-1 to 116-n, having a structure comparable to that of transmitter modules 104-1 to 104-n. Alternatively, optical demultiplexer 110 can include a known arrayed waveguide router. Receiver modules 116-1 to 116-n, in turn, generate output optical signals at wavelengths either the same or different than the WDM channel wavelengths. The output optical signals can then be supplied to one or more MANs, LANs, or WANs, for example, or other network.

Figure 2:
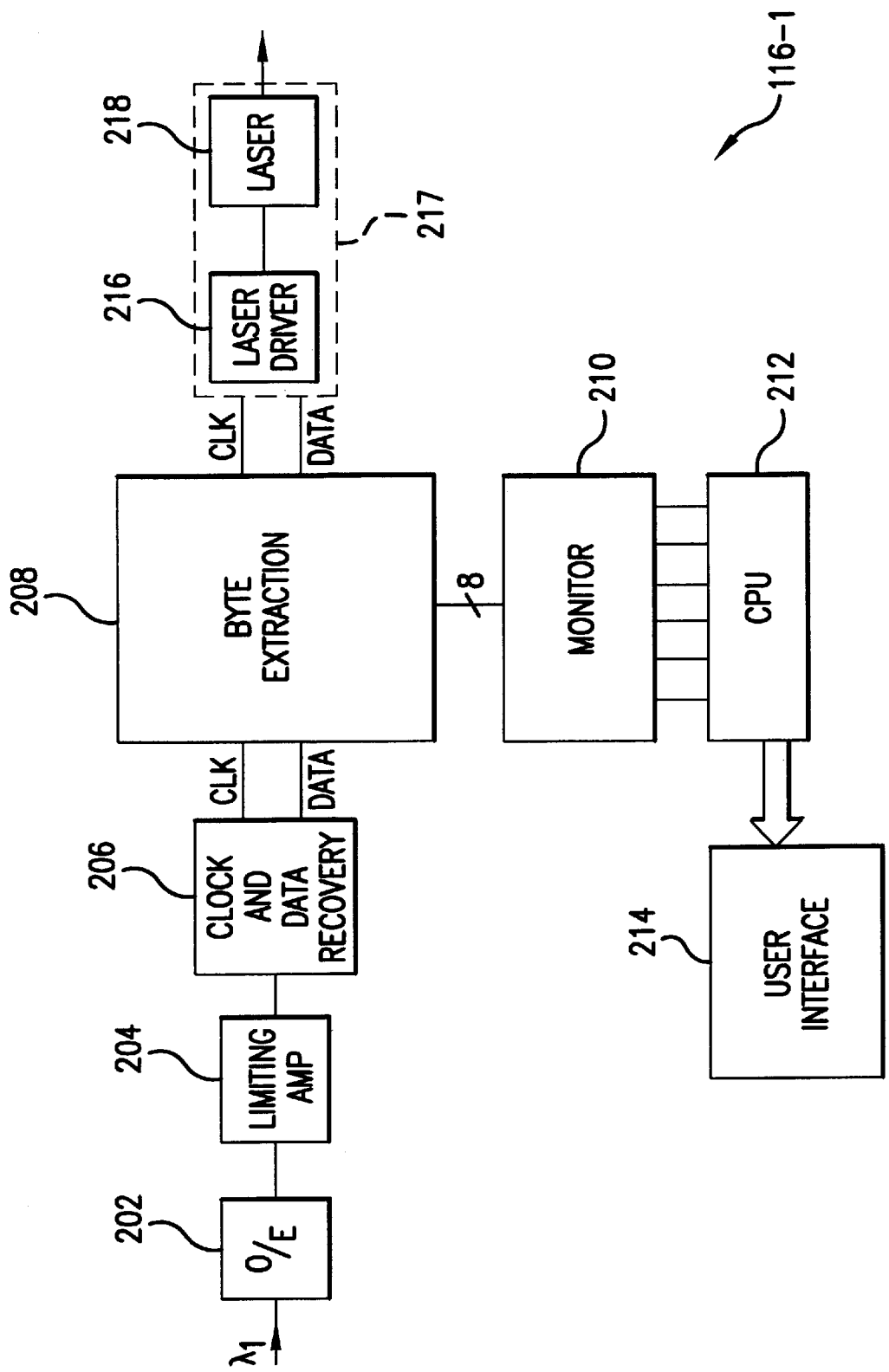
FIG. 2 illustrates a block diagram of a receiver module in accordance with the present invention.

FIG. 2 illustrates receiver module 116-1 in greater detail. Typically, receiver modules 116-2 to 116-n have a construction similar to that of receiver module 116-1. Receiver module 116-1 includes an optical-to-electrical converter 202, such as a photodetector, that receives optical signals at WDM wavelength $\lambda_1$ and generates electrical signal in response thereto. A known limiting amplifier 204 is coupled to photodetector 204 and outputs the electrical signals as discernible digital electrical pules.

The digital pulses are next supplied to a known clock and data recovery circuit 206, which outputs both a clock signal and a data signal in response to the output from limiting amplifier 204. Clock and data recovery circuit 206 is thus coupled to photodetector 202 via amplifier 204. The clock (CLK) and data signals are fed to a byte extraction circuit 208, which identifies SONET frames in the received train of digital pulses and extracts selected bytes from the SONET frames. The clock and data signals are further supplied to an optical emitter 217 comprising, for example, laser driver circuit 216 and associated laser 218. Laser driver circuit 216 drives laser 218 in accordance with the received data signals at a rate determined by the clock signals. Typically, laser 218 of optical emitter 217 is directly modulated. However, optical emitter 217 may include a laser that is externally modulated. Thus, optical emitter 217 is coupled to photodetector 202 via limiting amplifier 204, clock and data recovery circuit 206 and byte extraction circuit 208 such that optical signals are output from optical emitter 217 in accordance with electrical signals generated by photodetector 202.

As indicated above, the structure of transmitter modules 104-1 to 104-n is similar to the structure of receiver modules 116-1 to 116-n, and the optical emitters in transmitter modules 104-1 to 104-n can include either directly or externally modulated lasers. In addition, each of the optical emitters in the transmitter modules emit a respective one of the WDM channels $\lambda_1$ to $\lambda_n$, whereas the optical emitters in the receiver modules 116-1 to 116-n can emit at wavelengths either the same as or different from the WDM channels. Further, the photodetector associated with each transmitter module is coupled to a respective one of input ports 102-1 to 102-n.

Monitor circuit 210 assembles the bytes output by extraction circuit 208 into messages, compares successive messages with each other, and with a predetermined message. Monitor circuit 210 is controlled by a central processing unit (CPU), which also receives the results of the comparisons from monitor circuit 210 and outputs the results to user interface device 214, such as a display or other device that conveys information to a user.

Figure 3:
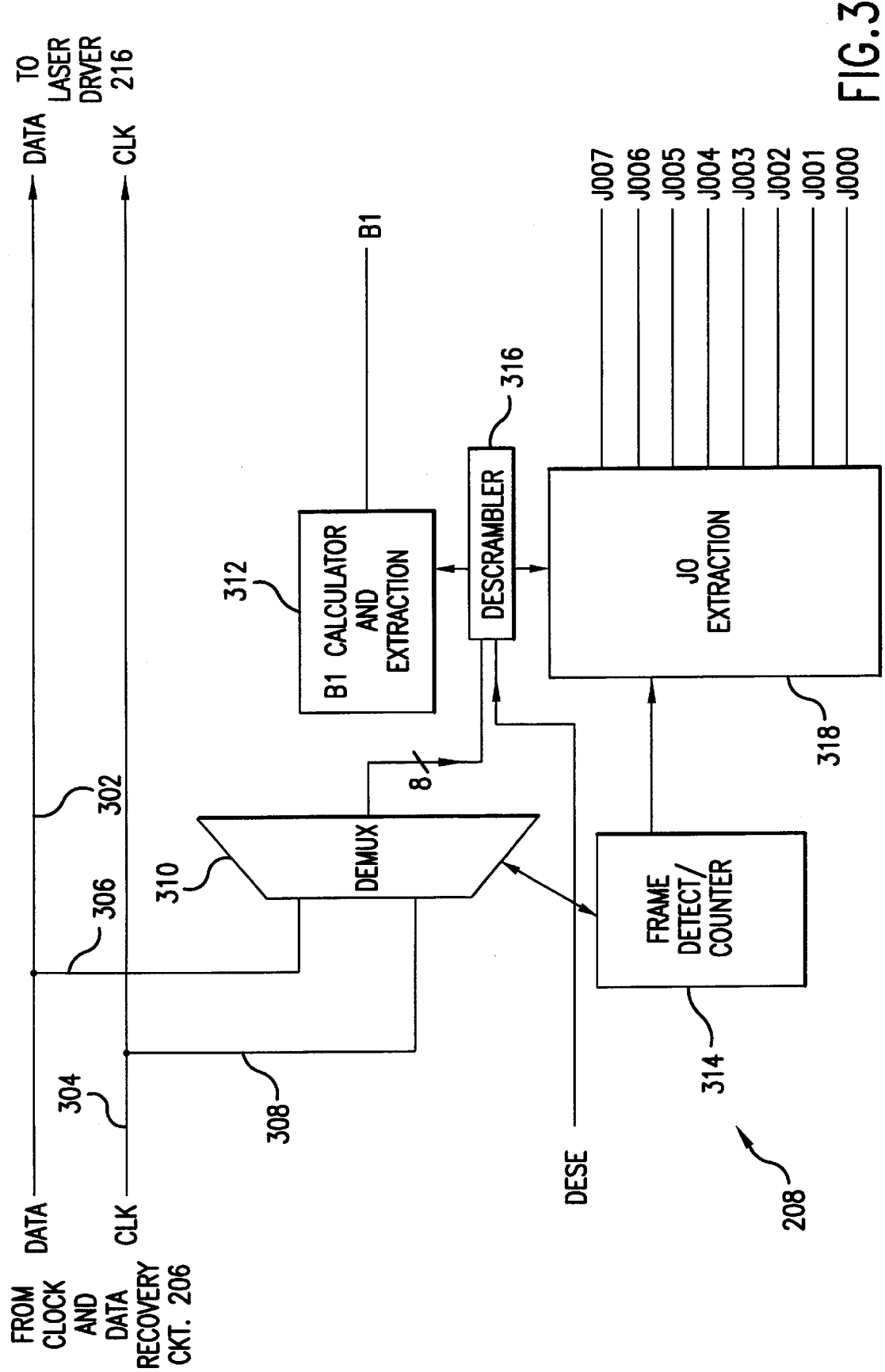
FIG. 3 illustrates a block diagram of a byte extraction circuit in accordance with the present invention.

FIG. 3 illustrates byte extraction circuit 208 in greater detail. Byte extraction circuit 208 receives data and clock signals on lines 302 and 304, respectively. Lines 302 and 304 supply the data and clock signals to laser drive circuit 216, as well as demultiplexer circuit 310 via lines 306 and 308, respectively. In general, the data signals are supplied to demultiplexer circuit 310 in a serial fashion. In which case, demultiplexer circuit 310 typically generates a parallel output, frequently eight bits wide, under control of frame detect/counter 314.

Frame detect/counter 314 senses the beginning of each received SONET frame and controls the output of demultiplexer circuit 310 in response thereto. As is generally known, as described in J. D. Gibson, "The Communications Handbook", pp. 542–553, SONET frames include a plurality of A1 (in hexadecimal) framing bytes in the beginning of each frame, and a plurality of A2 bytes at the end of each frame. Accordingly, frame detect/counter 314 detects the beginning of a frame as a transition from a plurality of A1 bytes to a plurality of A2 bytes. At which point, under control of frame detect/counter 314, demultiplexer circuit 310 outputs a frame of bytes to a known descrambler circuit 316 circuit, which descrambles a scrambled portion of the SONET frame in a known manner. Such descrambling occurs upon activation by signal DESE.

The descrambled frame is output from descrambler circuit 316 to B calculator and extraction circuit (hereinafter "B1 circuit") 312. Based on a known formula, B1 circuit 312 calculates and outputs a so-called B1 byte used for error detection. The B1 byte is located within a header portion of the SONET frame, otherwise referred to as the frame section level.

The descrambled frame is further supplied to J0 extraction circuit 318. The J0 byte (also known as a C1 byte) is typically located at a particular location within the SONET frame, usually the third byte of the frame after the header A1 bytes. This location is stored within frame detect/counter circuit 314. Frame detect/counter circuit 314, counts the number of bytes passing to J0 extraction circuit 318, and when the byte count matches the J0 location within the frame, frame detect/counter circuit 314 controls J0 extraction circuit 318 to output the J0 byte to monitor circuit 210 as eight bits, each of which on a respective one of eight parallel outputs J0D0 to J0D7.

Figure 4:
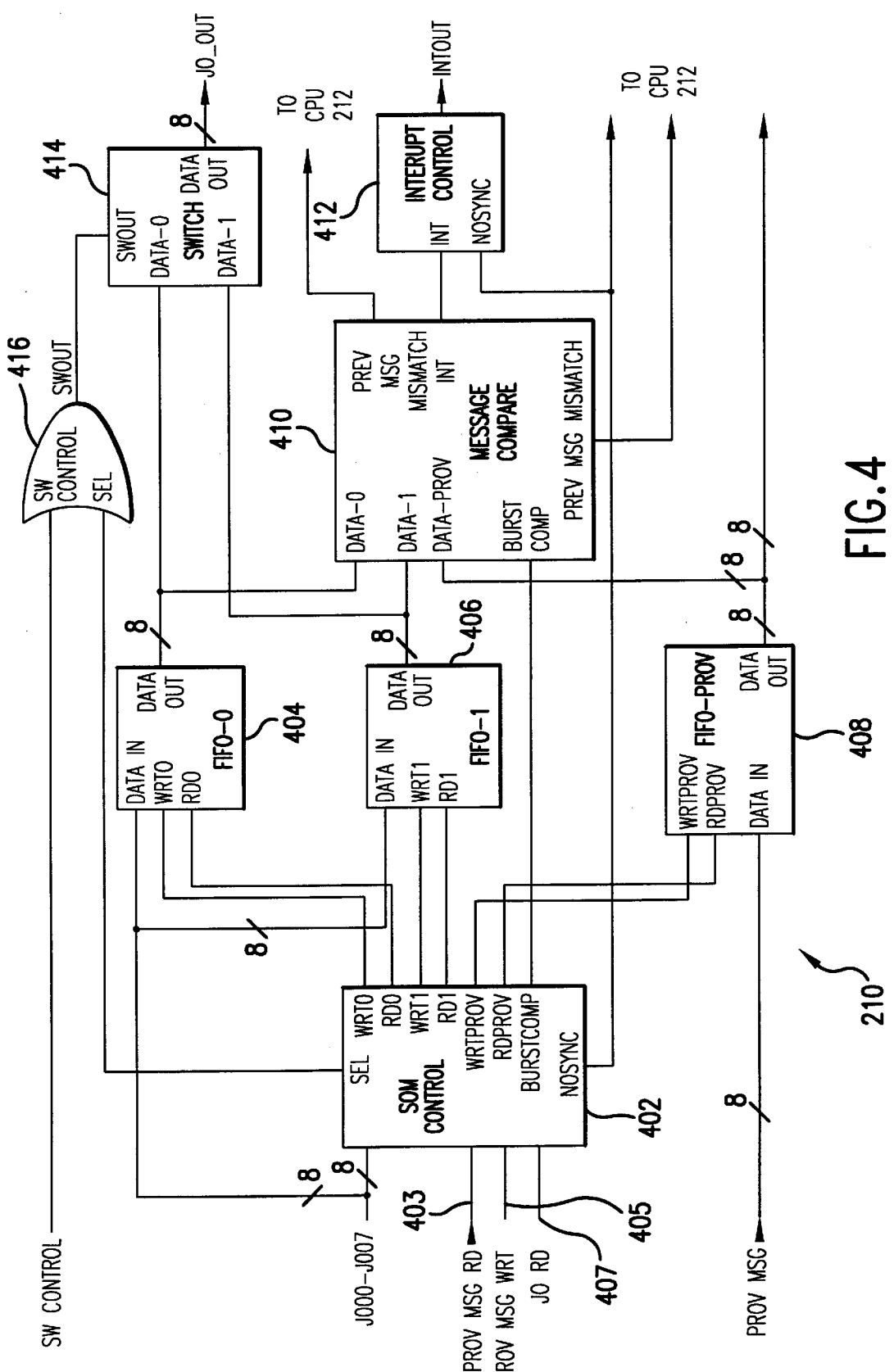
FIG. 4 illustrates a schematic diagram of a monitoring circuit in accordance with the present invention.

Monitor circuit 210 will next be described with reference to FIG. 4. Monitor circuit includes a start-of-message (SOM) control circuit coupled to outputs J0D0 to J0D7 of J0 extraction circuit 318. Outputs J0D0–J0D7 are further coupled to memory circuits, such as first-in-first-out (FIFO) buffers FIFO-0 404 and FIFO-1 406. Outputs WRT0 and WRT1 of SOM control circuit 402 are supplied to corresponding ports of FIFO-0 404 and FIFO-1 406 to thereby selectively store the J0D0 to J0D7 bits (i.e., the J0 byte) in FIFO-0 404 and FIFO-1 406 through respective ports DATA IN-0 and DATA IN-1. Generally, successive J0 bytes are stored in FIFO-0 404 and FIFO-1 406 to thereby assemble a message in each FIFO. The message can be of any length, but typically the messages are either 16 or 64 bytes long. The storage capacity of each FIFO is generally equal to the length of the message, e.g., 64 bytes.

Predetermined or provisional messages can be input one byte-at-a-time from CPU 212 through port 409 and stored in a separate FIFO buffer, FIFO-PROV 408, via input port DATAIN-PROV. In particular, CPU 212 outputs a control signal to PROVMSGWRT port 405 of SOM control circuit 402, which, in turn, generates output WRT PROV to a corresponding input port of FIFO-PROV 408.

Monitor circuit 210 further includes a message compare circuit 410, which compares messages stored in FIFO-0 404, FIFO-1 406 and FIFO-PROV 408. In order to make such a comparison, messages must first be output or read from the FIFO memory circuits and supplied to message compare circuit 410. This read out is initiated by CPU 212, which outputs appropriate signals to J0RD port 407 of SOM control circuit 402, to read from one of FIFO-0 404 and FIFO-1 406, and PROVMSGRD port 403 to read from FIFO-PROV. As a result, read signals are output from ports RD0, RD1 and RDPROV to corresponding ports of FIFO-0, FIFO-1 and FIFO-PROV, respectively. The messages are then output from DATA OUT ports of each of these FIFOs to respective DATA-0, DATA-1 and DATA-PROV input ports of message compare circuit 410, the provisional message output from FIFO-PROV is also output directly to CPU 212, which, in turn, can supply the provisional message to user interface 214. SOM control circuit 402 also generates a burst compare output at port BURSTCOMP, which is coupled to a corresponding port of message compare circuit 410. In response to the burst compare signal, message compare circuit 410 compares the messages received from FIFO-0 404 and FIFO-1 406, with each other, as well as with the provisional message received from FIFO-PROV 408. The comparison typically takes about 6 $\mu$seconds for 16 byte messages and about 18 $\mu$seconds for 64 byte messages.

In the event that the message stored in FIFO-0 404 is not the same as the message in FIFO-1 406, message compare circuit generates an interrupt signal at port INT, as well as a previous message mismatch signal at port PREV MSG MISMATCH. The interrupt signal is also generated when one of the messages stored in FIFO-0 404 or FIFO-1 406 differs from the provision message stored in FIFO-PROV 408. Under this condition, message compare circuit 410 also generates a provisional message mismatch at the PROVMSGMISMATCH port shown in FIG. 4.

Port INT of message compare circuit 410 is coupled to a corresponding port of interrupt control circuit 412, which generates an interrupt output signal at output INTOUT to CPU 212, thereby causing CPU 212 to interrupt in a known manner. The interrupt output signal is also generated in response to a failure to detect a unique J0 byte indicating the start of a message. Specifically, if SOM control circuit 402 does not detect the unique J0 byte, SOM control circuit 402 outputs a no-SOM signal through port NOSYNC to interrupt control circuit 412, which, in turn generates the interrupt output signal. The no-SOM signal is also supplied directly to CPU 212.

Messages stored in FIFO-0 404 and FIFO-1 406 can be selectively output to CPU 212 via switch 414, which operates under control of CPU 212 and SOM control circuit 402. As further shown in FIG. 4, a switch control signal is supplied to a first input SWCONTROL of OR gate 416 and a select signal is fed to a second input SEL of OR gate 416. OR gate 416 output SWOUT is supplied to a corresponding input port of switch 414 to selectively output the message received at DATA-0 or DATA-1 (i.e. messages received from either FIFO-0 404 or FIFO-1 406) through port DATA OUT. Messages are typically output from switch 414 as successive bytes J0-OUT, each of which including eight parallel bits.

The typical sequence for outputting messages stored in FIFO-0 404 and FIFO-1 406 will next be described. If FIFO-0 404 is currently being supplied with J0 bytes, SWCONTROL and/or SEL are controlled such that the message stored in FIFO-1 406 is output. On the other hand, if FIFO-1 406 is in the process of receiving J0 bytes, SWCONTROL and/or SEL are controlled such that the message stored in FIFO-0 404 is output.

Figure 5:
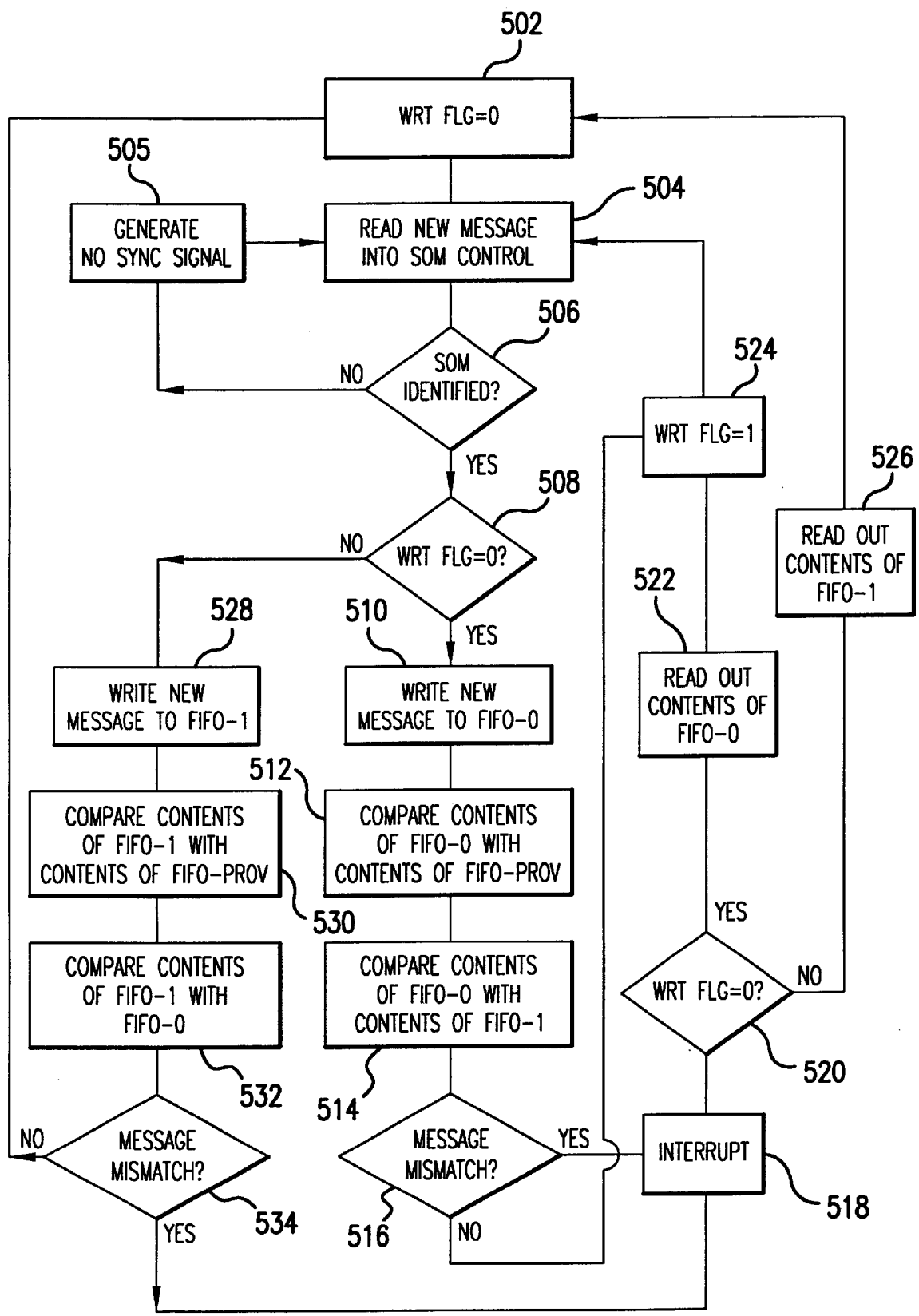
FIG. 5 illustrates a generalized flow chart for a process for monitoring J0 messages.

The operation of monitor circuit 210 will be further described with reference to FIG. 5, which illustrates a generalized flow chart for a process for monitoring J0 messages. In step 502, a write flag bit WRTFLG is set to zero to thereby designate FIFO-0 404 for receiving a message. In step 504, a new message is read into SOM control circuit 402 from outputs J0D0–J0D7 of byte extraction circuit 208. Logic within SOM control circuit 402 next searches for a particular byte identifying a start of message (SOM), for example, a null (0), carriage return, or line feed character. In step 506, if the SOM is not identified, an appropriate signal is output at port NOSYNC (step 505) and output directly to CPU 212. In addition, the NOSYNC output signal is supplied to interrupt control circuit 412, which, in turn, generates an interrupt signal at INTOUT. Otherwise, a determination is made as to whether WRTFLG is equal to zero (step 508), if "yes", SOM control circuit 402 generates a signal at output WRT0 and the new message is written to FIFO-0 404. Next, in response to signals received from CPU 212 on inputs PROVMSGRD and J0RD, SOM control circuit generates signals at ports RD0, RD1 and RDPROV, so that the contents of FIFO-0 404, FIFO-1 406 and FIFO-PROV 408 are supplied to message compare circuit 410. A burst comparison signal is then output from BURSTCOMP 402 to message compare circuit 410, which then compares the message stored in FIFO-0 404 with the message stored in FIFO-1 406 (step 512), and compares the message stored in FIFO-0 404 with the message stored in FIFO-PROV 408 (step 514). If message compare circuit 410 detects a mismatch (step 516) between the messages stored in FIFO-0 404 and FIFO-1 406 (a "previous message mismatch"), a previous message mismatch signal is output through port PREVMSGMISMATCH to CPU 212, while a mismatch between the messages stored FIFO-0 404 and FIFO-PROV 408 results in a provisional message mismatch signal output through port PROVMSGMISMATCH to CPU 212. In either case, however, if a mismatch is detected, a signal is output through port INT of message compare circuit 410, thereby causing interrupt control circuit 412 to generate an interrupt signal at INTOUT (step 518) to CPU 212. An alarm signal can then be output from CPU 212 to user interface device 214 in response to the received interrupt signal.

After the interrupt is generated, logic within SOM control circuit next controls the output of the message stored in FIFO-0 404 to CPU 212. Namely, a determination is made as to whether WRTFLG is equal to zero, i.e., whether the message stored in FIFO-0 404 is to be output. If "yes", an appropriate selection signal is output at port SEL of SOM control circuit 402, thereby causing OR gate 416 to control switch 414 through port SWOUT to output the message (step 522) received at input DATA-0 (i.e., the message received from FIFO-0 404) to CPU 212, which can further output the message to user interface 214. In step 524, WRTFLG is set to one and a new message is read into SOM control (step 504). If no message mismatch is detected, the SOM control circuit logic skips to step 524 and no message is read out from FIFO-0 404 to CPU 212.

Steps 506 and 508 are next repeated, but the logic within SOM control circuit 402 branches to steps 528, 530, 532 and 534 when WRTFLG is equal to 1, i.e., the new message is stored in FIFO-1 406. Steps 530, 532 and 534 are similar to steps 512, 514 and 516 with the exception that comparisons are made between the messages stored in FIFO-1 406 and FIFO-0 404, and messages FIFO-1 406 and FIFO-PROV 408. If no mismatch is detected, the logic returns to step 502 to thereby reset WRTFLG to zero. If either a previous message mismatch or a provisional message mismatch is detected, an interrupt is generated (step 518), a determination is made that WRTFLG equals one (step 520), and the contents (i.e., the message) of FIFO-1 406 are read out through switch 414 to CPU 212 (step 526), which, in turn, can output the message to user interface 214. SOM control circuit 402 logic next returns to step 502, where WRTFLG is set to zero, and the above process is repeated. Typically, the logic within SOM control circuit 402 continuously cycles through the process steps shown in FIG. 5, such that new messages are alternately stored in FIFO-0 404 and FIFO-1 406.

Thus, J0 messages, carrying, for example, WDM channel identifiers, can be effectively monitored by comparing newly received messages, with previously received messages as well as a predetermined message. Accordingly, the existence of a fault within a WDM system can be readily ascertained. Moreover, by monitoring J0 messages at the transmit and receive terminals of a WDM system, for example, faults can be located quickly.

While the foregoing invention has been described in terms of the embodiments discussed above, numerous variations are possible. For example, the present invention is also applicable to synchronous digital hierarchy (SDH) formatted signals in addition to SONET signals discussed above. Accordingly, modifications and changes such as those suggested above, but not limited thereto, are considered to be within the scope of the following claims.

What is claimed is:

1. A method for monitoring portions of a data stream, said method comprising the steps of:
   extracting each of a first plurality of data segments from a respective one of a first plurality of data frames included in said data stream;
   assembling said first plurality of data segments into a first message;
   storing said first message in a first memory circuit;
   extracting each of a second plurality of data segments from a respective one of a second plurality of frames included in said data stream;
   assembling said second plurality of data segments into a second message;
   storing said second message in a second memory circuit;
   comparing said first message with said second message; and
   generating an alarm signal in response to said comparison of said first and second messages.

2. A method in accordance with claim 1, further comprising the step of outputting one of said first and second messages to a user interface device when said first and second messages are different.

3. A method in accordance with claim 1, further comprising the steps of:
   storing a predetermined message in a third memory circuit;
   comparing one of said first and second messages with said predetermined message; and
   outputting said one of said first and second messages to a user interface device when said one of said first and second messages is different than said predetermined message.

4. A method in accordance with claim 1, wherein each of said first plurality of data frames and each of said second plurality of data frames are in a SONET format.

5. A method in accordance with claim 1, wherein each of said first plurality of data frames and each of said second plurality of data frames are in an SDH format.

6. A method in accordance with claim 1, wherein each of said first plurality of data segments and each of said second plurality of data segments include a J0 byte.

7. A method in accordance with claim 6, further comprising the step of generating a B1 byte for each of said first and second pluralities of data franes.

8. A method for monitoring portions of a data stream, comprising the steps of:
   extracting each of a plurality of data segments from a respective one of a plurality of data frames included in said data stream;
   assembling said plurality of first data segments into a first message;
   storing said first message in a first memory circuit;
   storing a second predetermined message in a second memory circuit;
   comparing said first message with said second predetermined message; and
   generating an alarm signal in response to said comparison of said first message and said second predetermined message.

9. A method in accordance with claim 8, further comprising the step of outputting said first message to a user interface device when said first message is different from said second predetermined message.

10. A method in accordance with claim 8, wherein each of said plurality of data frames is in a SONET format.

11. A method in accordance with claim 8, wherein each of said plurality of data frames is in an SDH format.

12. A method in accordance with claim 8, wherein each of said plurality of data segments includes a J0 byte from each of said plurality of data frames.

13. A data communication apparatus, comprising:
   a data path carrying a plurality of data frames;
   an extraction circuit coupled to said data path, said extraction circuit outputting a plurality of data segments, each of which being selected from a respective one of said plurality of data frames;
   a first memory circuit coupled to said extraction circuit, said first memory circuit receiving and storing first ones of said plurality of data segments as a first message;
   a second memory circuit coupled to said extraction circuit, said second memory circuit receiving and storing second ones of said plurality of data segments as a second message; and
   a comparison circuit coupled to said first and second memory circuits, said comparison circuit comparing said first and second messages and generating an output signal in response to said comparison.

14. A data communication apparatus in accordance with claim 13, further comprising:
   a third memory circuit coupled to said comparison circuit, said third memory circuit storing a predetermined message, said comparison circuit further comparing said predetermined message with one of said first and second messages, and generating an additional output signal in response to said comparison of said predetermined message and one of said first and second messages.

15. A data communication apparatus in accordance with claim 13, further comprising:
   a control circuit coupled to said extraction circuit and said first and second memory circuits, said control circuit outputting first and second write signals to said first and second memory circuits, said first memory circuit storing said first message in response to said first write signal, and said second memory circuit storing said second message in response to said second write signal.

16. A data communication apparatus in accordance with claim 15, wherein said first and second write signals alternate.

17. A data communication apparatus in accordance with claim 15, wherein said control circuit is further coupled to said third memory circuit, said control circuit further outputting a third write signal to said third memory signal, said third memory circuit storing said predetermined message in response to said third write signal.

18. A data communication apparatus in accordance with claim 13, further comprising:
   a user interface device; and
   a switch circuit, said switch circuit having first and second inputs coupled to said first and second memory circuits, respectively, and an output coupled to said user interface device, said switch circuit selectively supplying one of said first and second messages to said user interface device.

19. A data communication apparatus in accordance with claim 13, wherein each of said data segments includes a J0 byte.

20. A data communication apparatus in accordance with claim 13, wherein each of said plurality of data frames is in a SONET format.

21. A data communication apparatus in accordance with claim 13, wherein each of said plurality of data frames is in an SDH format.

22. A data communication apparatus, comprising:

an optical-to-electrical conversion element having an input coupled to an optical communication path and an output, said optical-to-electrical conversion element receiving optical signals carried by said optical communication path at said input and generating electrical signals in response thereto at said output;

a data recovery circuit coupled to said optical-to-electrical conversion element, said data recovery circuit generating a stream of data signals in response to said electrical signals, said data signals including a plurality of frames;

an electronic data path coupled to said data recovery circuit and carrying said stream of data signals;

an extraction circuit coupled to said electronic data path, said extraction circuit selecting each of a plurality of data segments from a respective one of said plurality of frames;

a first memory circuit coupled to said extraction circuit, said first memory circuit storing first ones of said plurality of data segments as a first message;

a second memory circuit coupled to said extraction circuit, said second memory circuit storing second ones of said plurality of data segments as a second message; and a comparison circuit coupled to said first and second memory circuits, said comparison circuit comparing said first and second messages and generating a comparison signal in response thereto.

23. A data communication apparatus in accordance with claim 22, further comprising:

a driving circuit coupled to said electronic data path; and an optical element coupled to said driving circuit, said driving circuit controlling said optical element in accordance with said stream of data signals.

24. A data communication apparatus in accordance with claim 22, further comprising:

a third memory circuit coupled to said comparison circuit and storing a third predetermined message, said comparison circuit comparing said third predetermined message with one of said first and second messages and generating a further output signal in response thereto.

25. A data communication apparatus in accordance with claim 22, further comprising:

an optical demultiplexer coupled to said optical communication path and being configured to direct said optical signals to said optical-to-electrical conversion element, said optical signals being at a particular wavelength, said optical communication path being configured to carry a plurality of other optical signals, each at a wavelength different than said optical signals directed to said optical-to-electrical conversion element by said optical demultiplexer.

* * * * *